Oct. 29, 1940.  L. G. COPEMAN  2,219,297
BIRDHOUSE
Filed July 30, 1937   4 Sheets-Sheet 2
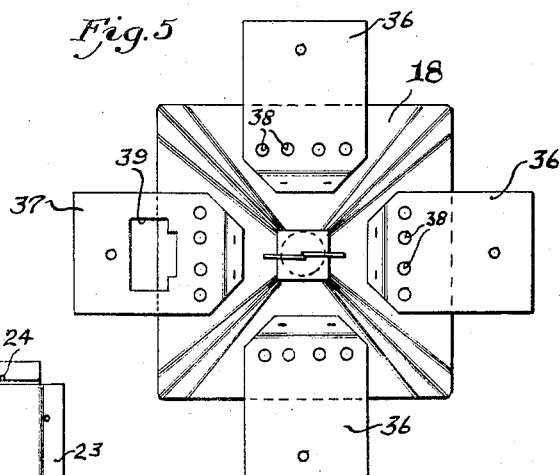
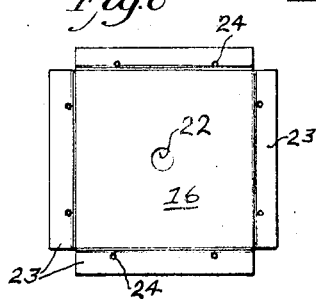
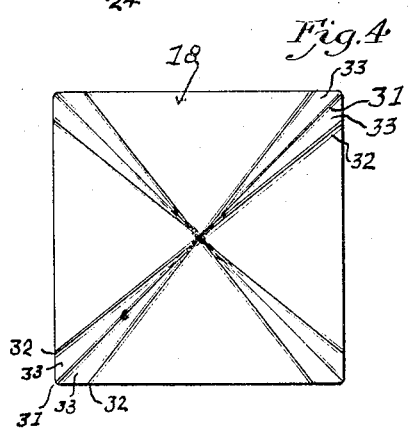
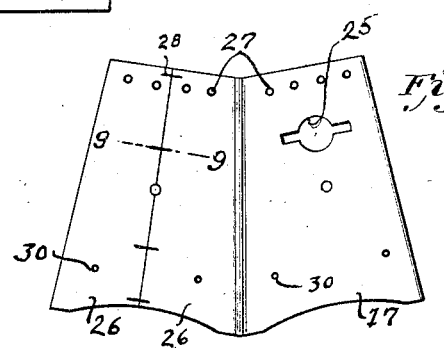
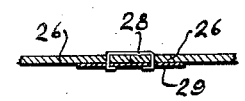
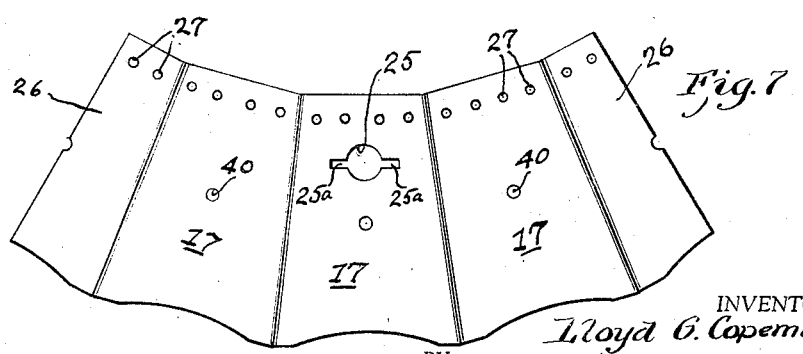
INVENTOR.
Lloyd G. Copeman
BY Barnes, Kisselle, Laughlin & Raisch
ATTORNEYS Oct. 29, 1940.    L. G. COPEMAN    2,219,297
BIRDHOUSE
Filed July 30, 1937    4 Sheets-Sheet 3

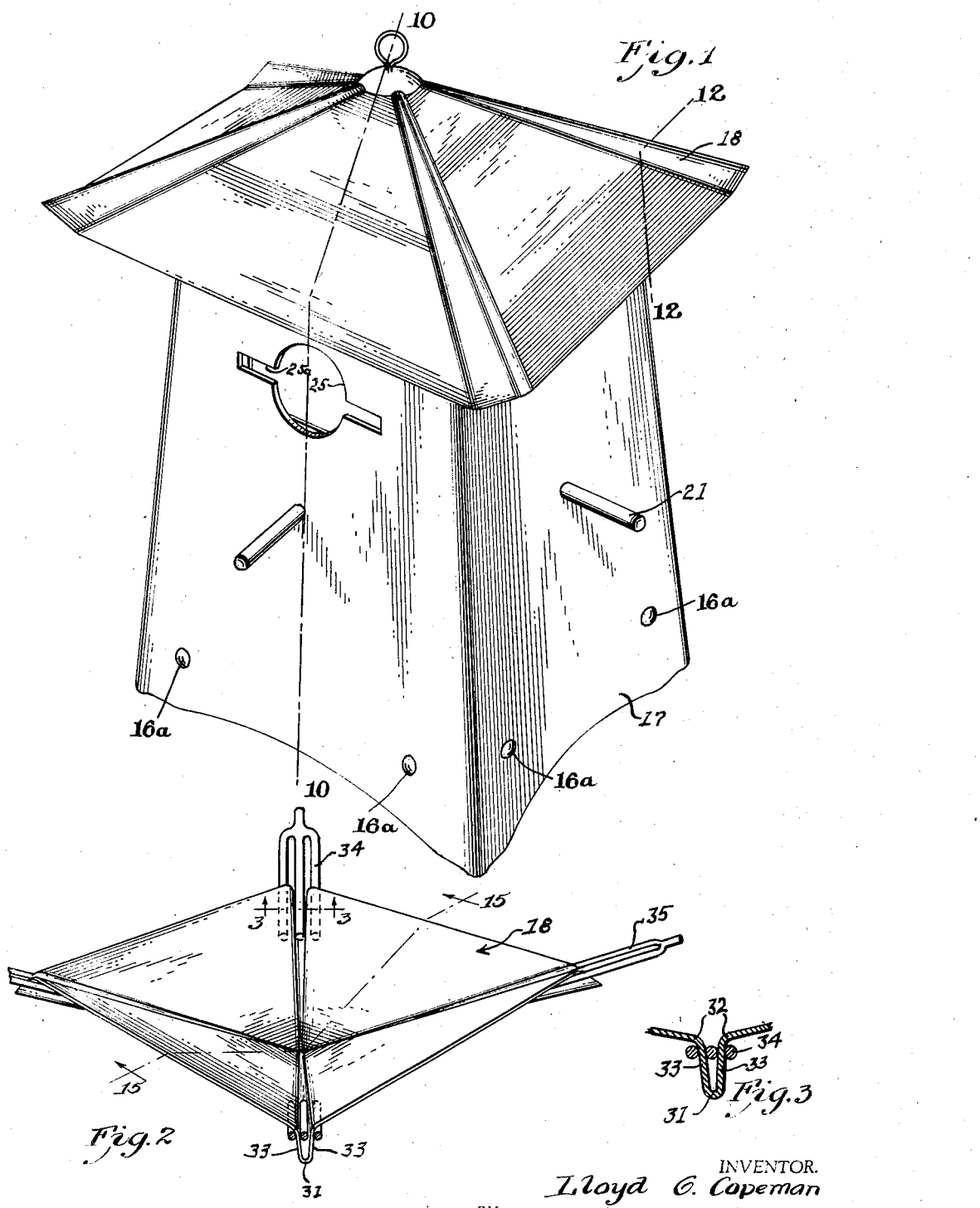

INVENTOR.
Lloyd G. Copeman
BY
Barnes, Kisselle, Laughlin & Raisch
ATTORNEYS

Oct. 29, 1940.  L. G. COPEMAN  2,219,297
BIRDHOUSE
Filed July 30, 1937  4 Sheets-Sheet 4
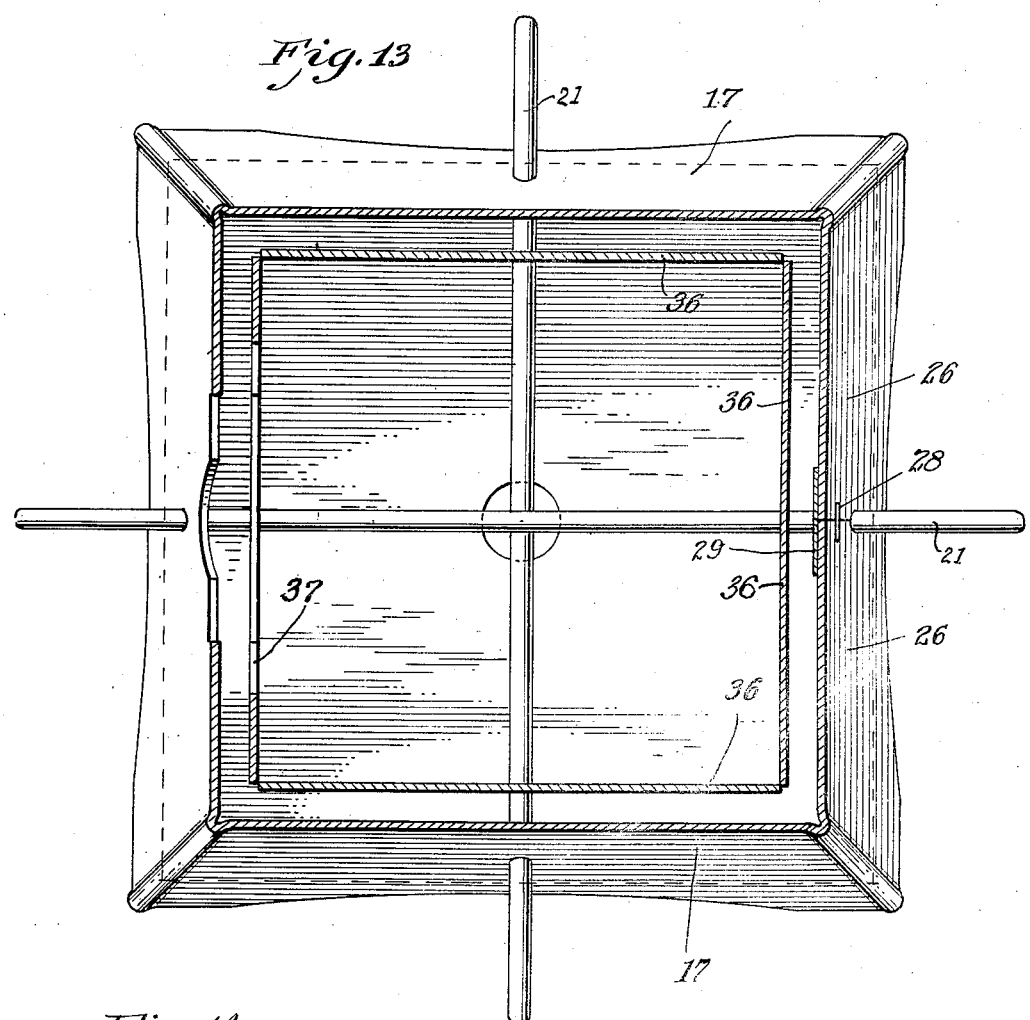
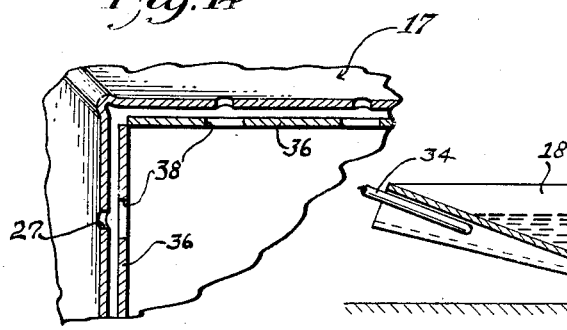
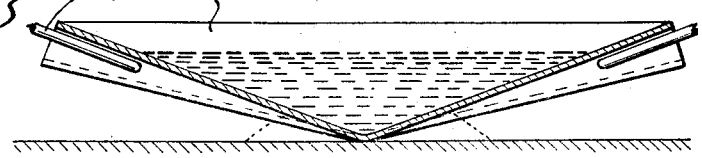
INVENTOR.
Lloyd G. Copeman
BY Barnes, Kisselle, Laughlin & Raisch
ATTORNEYS Patented Oct. 29, 1940

2,219,297

UNITED STATES PATENT OFFICE 2,219,297

BIRDHOUSE

Lloyd G. Copeman, Flint, Mich.

Application July 30, 1937, Serial No. 156,443

8 Claims. (Cl. 119—23)

This invention relates to improvements in collapsible birdhouses and bird baths.

It is old in the art to provide birdhouses formed from blanks of waterproof sheet material and reinforced by a removably mounted perch passing through adjacent or opposite sides of the assembled birdhouse. The present invention relates to an improved structure for this type of birdhouse. An object of the invention is to provide a collapsible birdhouse which can be manufactured and sold at a price low enough so that the birdhouse can be destroyed at the end of the year with the vermin that have collected therein. A further object is to provide a birdhouse which, when in collapsed condition, has very little bulk and thus may be conveniently handled between the manufacture and the sale thereof.

A further object of the invention is to provide a cover member which may be used alternatively as a cover for the house and as a bird bath.

Other features of the invention include a novel reinforcing structure which is adapted to serve as an insulation for the top portion of the birdhouse and which also allows ample ventilation of the enclosure. A further feature of the present invention is embodied in the shape of the entrance opening, being so designed that a bird may easily pass in and out while bearing twigs and other materials for the formation of a nest within the birdhouse.

In the drawings:

Fig. 1 represents an assembly perspective view of the assembled birdhouse.

Fig. 2 illustrates the roof portion of the birdhouse in inverted position whereby it may serve as a bird bath.

Fig. 3 is the cross section taken on the lines 3—3 of Fig. 2.

Fig. 4 is a plan view of the roof member.

Fig. 5 is a plan view of the roof member with the reinforcing portions attached thereto.

Fig. 6 is a plan view of the bottom of the birdhouse.

Fig. 7 is a blank of the side walls of the birdhouse before they are folded to form an enclosure.

Fig. 8 is a modification of Fig. 7 showing the manner in which the ends of the side wall members are connected together and a different location of the entrance hole.

Fig. 9 is a cross section taken on lines 9—9 of Fig. 8 showing the joint between the respective ends of the side wall member.

Figure 10:
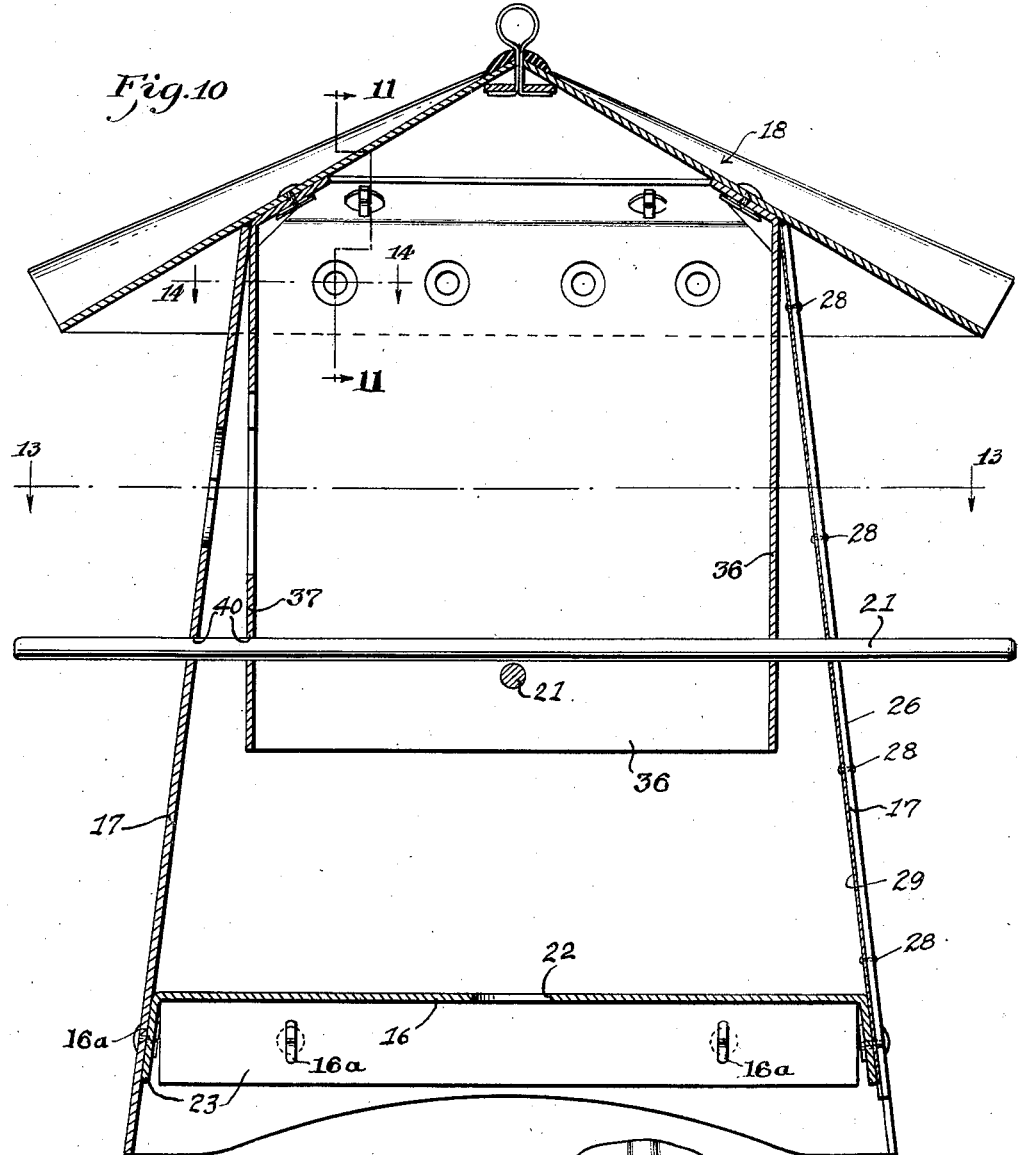
Fig. 10 is a cross section on lines 10—10 of Fig. 1 showing the ventilation holes and the relation of the reinforcing and insulation members to the side walls and roof member.
Figure 11:
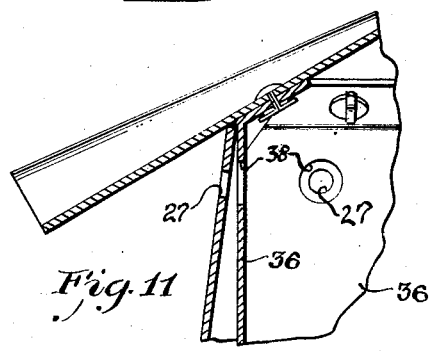
Figure 12:
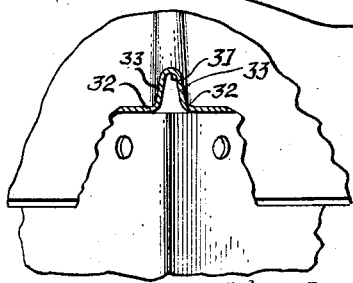

Figs. 11 and 12 are detailed cross sections taken on lines 11—11 of Fig. 10 and 12—12 of Fig. 1 showing the eave portions of the birdhouse and showing the ventilation features of the side walls and the roof member.

Fig. 13 is a cross section plan view of the assembled birdhouse taken on the lines 13—13 of Fig. 10.

Fig. 14 is a cross section of the assembly taken on line 14—14 of Fig. 10.

Fig. 15 is a cross section of the inverted roof member taken on lines 15—15 of Fig. 2 and illustrating the manner in which water can be held therein.

Referring in particular to the cross sectional assembly view in Fig. 10, the birdhouse consists generally of a bottom member 16, side walls 17, a roof member 18, depending members attached 20 at the top to the roof member as will be later described and a perch 21 extending through the side walls 17 and depending members.

The bottom member 16 is illustrated in plan view in Fig. 6 and consists generally of the square midportion having hole 22 in the middle thereof for ventilation purposes and having side members 23 creased along the edge of the bottom member to allow them to fold at right angles to the bottom member. Side members 23 are perforated as at 24 to allow them to be fastened to the side walls 17 as later described. The side walls 17 are shown in flat position in Fig. 7. The three side walls 17 are identically shaped, the center side wall being provided with an opening 25 which forms the entrance to the birdhouse. The opening 25 is provided with two horizontal diametrical slots 25a extending a short distance on each side of the circular opening and preferably about ¼ inch in width. These slots 25a are provided to allow a bird more easily to bring twigs and string and grass and other materials into the birdhouse to form a nest. This entrance formation has resulted in a bird being able to enter the house carrying, for example, a twig on its first attempt, whereas with the previous round opening the bird might be required to make several attempts to get the twig into the birdhouse before it would be able to successfully maneuver through the opening.

The back of the birdhouse is formed from walls 26 formed on each end of the side wall blank (see Fig. 7). Each of the side wall members 17 and 26 is provided with ventilating holes 27 near the top and the waterproof cardboard is creased between each of the wall members 17 and 26 to allow relative folding between the side walls. When the birdhouse is being assembled the walls 26 are drawn together as shown in Fig. 9, and locked in place by a wire staple 28 or adhesive tape 29 or both. It will be seen from Figs. 7 and 8 that the entrance hole 25 can be placed in any one of the side walls. As shown in Fig. 8 the side wall members are provided with holes 30 adapted to engage with the holes 24 in the bottom member 16. Split rivets 16a are used to fasten the bottom to the side walls.

An important feature of the present invention resides in the top member 18, the blank of which is shown in Fig. 4. Each corner portion of the roof member is creased in three places, the central creases 31 of each corner being struck in opposite directions from the angle creases 32 which extend from the center of the roof member to each side of the central corner creases 31. For example, referring to Fig. 12, assuming that the crease 31 is upward, the angle creases 32 would be downward so that when the portions 33 lying between the two creases are bent or crimped to a substantially parallel relationship, the roof will assume a four way pitch from the center, the pitch of the roof being determined by the angle between the creases 31 and 32. In addition to being an inexpensive method of forming the roof member, the result is a roof which is highly reinforced by the corner crimping and which is also decorative in appearance.

The roof member 18 may be used as a bird bath, as shown in Figs. 2 and 15, the corners being folded or crimped as previously described so that the roof member 18 is substantially in the shape of a four sided pyramid. Wire clips or prongs 34 and 35 are necessary to hold the corners in folded position. In this manner an inexpensive highly reinforced bird bath is formed.

When the roof member 18 is to be used as a roof for the birdhouse, it is provided with auxiliary side members 36 and 37 which are attached and hinged to the slanting portions of the roof member and adapted to depend therefrom as shown in Fig. 10. The depending auxiliary side walls or members 36 are each provided with ventilating holes 38 located to register substantially with the ventilating holes 27 in the side walls 17 and 26 when the birdhouse is assembled (see especially Figs. 11 and 14). The auxiliary side member 37 is provided with a substantially large opening 39 adapted to register with the entrance 25 in the main side wall 17. The side wall members 17, 26, 36 and 37 are provided with holes 40 for receiving rigid perches 21, the said perches serving to reinforce the assembled birdhouse. In using member 18 as a cover for the birdhouse it is unnecessary to clip the folds of the corner together since the auxiliary members 36 and 37, when drawn into place by the perches 21 will determine the pitch of the roof member 18. It will be readily seen that perches are unnecessary to hold the birdhouse in assembled relationship since any type of pin fastening device will serve to hold the auxiliary sides and the roof in position. The top of the birdhouse can easily be provided with a suspension member to facilitate placing of the house in a suitable location for occupancy. The entrance hole can be made different sizes in different houses to allow for different birds and, since wren houses are preferably made without a perch near the entrance, some other means could be provided for holding the wren sized house in assembled position.

It will be seen that the combination of the auxiliary sides 36 and the side walls 17 and 26 provides a well ventilated, insulated and reinforced structure which will withstand sun, wind, and rain and which may be manufactured at a low cost and conveniently packaged in collapsed condition for purposes of distribution.

The words "crimped" or "crimp" as used in the specification and claims are intended to mean a folding in or folding out of a triangular portion of the roof blank, each crimp requiring three folds in the blank, the middle fold being in a direction opposite the folds to each side.

The construction disclosed herein need not necessarily be confined to use as a birdhouse but the body may take other shapes such as a bird shelter or feeding station or similar structure.

I claim:

1. A birdhouse formed of waterproof sheet material comprising a bottom, exterior side walls, means for attaching the bottom to the side walls, a top member sloping from the center thereof and having crimped portions to determine the pitch of said member, individual interior depending side members fastened to and depending from the underside of said top member, and means for attaching the exterior side walls and the interior side members in assembled relation whereby said top member is maintained in pyramidal shape.

2. A structure to be used as a birdhouse or similar structure formed of waterproof sheet material comprising a bottom member, side walls formed from a blank folded to form sides, means for fastening said bottom to said side walls, and a top comprising a square having each corner triple-creased from the center, the middle crease being in one direction and the side creases being in the other, the angle between said middle crease and said side creases being predetermined to limit the maximum pitch of the roof when assembled, and means for attaching said top to said side walls to complete the assembly.

3. A structure to be used as a birdhouse or similar structure formed of waterproof sheet material comprising a bottom member, side walls folded around and fastened to said bottom member to form equal sides, and a top blank having creases from the center thereof whereby three or more portions of said blank may be folded in to draw said blank into pyramidal shape, and means for attaching said top to the side walls.

4. A birdhouse formed of waterproof sheet material comprising a bottom member, exterior side walls integrally connected at each corner and provided with a row of ventilating holes at the top edge and an entrance hole in one side with horizontal diametrical slots extending therefrom, means for holding the bottom to the side walls, a top member sloping toward each edge from the center, and corners on said top member, each being folded in to provide the slope of said roof, and a hinged depending member attached to each sloping side of said top member and provided with holes adapted to register with the holes in said side walls, and means to hold each of said depending members in substantially spaced relationship with the respective side walls.

5. A birdhouse formed of waterproofed sheet material comprising sides folded to define an enclosure, a bottom member and means for attaching the same to said sides, and a roof member defining a pyramid with a turned out portion at each slanting edge, independent auxiliary side members depending from the interior of said roof member, and means for fastening said auxiliary side members to said sides whereby insulation for said house is effected, said side members being dimensioned to form a substantial enclosure when in assembled position.

6. A birdhouse formed of waterproofed sheet material comprising sides folded to define an enclosure, a bottom member and means for attaching the same to said sides, and a roof member defining a pyramid with a turned out portion at each slanting edge, auxiliary side members depending from said roof member, and rigid perches adapted to be thrust through said sides and auxiliary side members to hold said roof in position.

7. A birdhouse formed of waterproof sheet material comprising a bottom member, exterior side walls integrally connected at each corner and provided with a row of ventilating holes at the top edge and a round entrance hole in one side with horizontal diametrical slots extending therefrom, a top member sloping toward each edge from the center and having a portion of each corner folded in to provide the slope of said roof, and hinged depending members attached to each sloping side of said top member and provided with holes adapted to register with the holes in said side walls, and one or more rigid perches extending through exterior side walls and depending members to hold the top member in assembled position.

8. A structure to be used as a birdhouse or similar structure comprising a top member adapted too be shipped flat, a bottom member, side walls for defining the structure in general connected to said bottom member, and connecting means, in the form of interior independent side walls depending from said top member, for said member and side walls adapted to give said member a predetermined fixed shape, said connecting means having a width slightly less than said side walls whereby a substantial enclosure is formed within said structure.

LLOYD G. COPEMAN.